US 6,930,074 B2

United States Patent
Khare et al.

(10) Patent No.: US 6,930,074 B2
(45) Date of Patent: Aug. 16, 2005

(54) DESULFURIZATION AND SORBENT FOR THE SAME

(75) Inventors: Gyanesh P. Khare, Kingwood, TX (US); Glenn W. Dodwell, Bartlesville, OK (US)

(73) Assignee: ConocoPhillips Company - I. P. Legal, Houston, TX (US)

( * ) Notice: Subject to any disclaimer, the term of this patent is extended or adjusted under 35 U.S.C. 154(b) by 118 days.

(21) Appl. No.: 10/133,075

(22) Filed: Apr. 26, 2002

(65) Prior Publication Data

US 2003/0203815 A1 Oct. 30, 2003

(51) Int. Cl.$^7$ ................................................ B01J 23/02
(52) U.S. Cl. ...................................... 502/342; 502/414
(58) Field of Search ................................ 502/414, 400, 502/341, 342, 343

(56) References Cited

U.S. PATENT DOCUMENTS

| | | | | |
|---|---|---|---|---|
| 4,381,991 A | * | 5/1983 | Bertolacini et al. | 208/113 |
| 5,248,489 A | | 9/1993 | Kidd et al. | 423/220 |
| 5,439,867 A | | 8/1995 | Khare et al. | 502/407 |
| 5,914,292 A | | 6/1999 | Khare et al. | 502/406 |
| 5,990,030 A | * | 11/1999 | McCauley | 502/64 |
| 6,056,871 A | | 5/2000 | Khare et al. | 208/250 |
| 6,184,176 B1 | | 2/2001 | Khare | 502/407 |
| 6,254,766 B1 | | 7/2001 | Sughrue et al. | 208/244 |
| 6,271,173 B1 | | 8/2001 | Khare | 502/406 |
| 6,274,533 B1 | | 8/2001 | Khare | 502/343 |

* cited by examiner

*Primary Examiner*—Edward M. Johnson
(74) *Attorney, Agent, or Firm*—Bronwyn A. Welvaert

(57) ABSTRACT

A sorbent composition comprising a promoter metal, zinc oxide, and a high density refractory metal oxide can be used to more effectively desulfurize a sulfur-containing fluid such as cracked-gasoline or diesel fuel.

20 Claims, No Drawings

DESULFURIZATION AND SORBENT FOR THE SAME

BACKGROUND OF THE INVENTION

This invention relates to a sorbent composition, a process of making a sorbent composition, and a process of using a sorbent composition for the removal of sulfur from a sulfur-containing fluid.

Hydrocarbon-containing fluids such as gasoline and diesel fuels typically contain a quantity of sulfur. High levels of sulfur in such automotive fuels is undesirable because oxides of sulfur present in automotive exhaust may irreversibly poison noble metal catalysts employed in automobile catalytic converters. Emissions from such poisoned catalytic converters may contain high levels of non-combusted hydrocarbons, oxides of nitrogen, and/or carbon monoxide, which, when catalyzed by sunlight, form ground level ozone, more commonly-referred to as smog.

Much of the sulfur present in the final blend of most gasolines originates from a gasoline blending component commonly known as "cracked-gasoline." Thus, reduction of sulfur levels in cracked-gasoline will inherently serve to reduce sulfur levels in most gasolines, such as, automobile gasolines, racing gasolines, aviation gasolines, boat gasolines, and the like.

Many conventional processes exist for removing sulfur from cracked-gasoline. However, most conventional sulfur removal processes, such as hydrodesulfurization, tend to saturate olefins and aromatics in the cracked-gasoline and thereby reduce its octane number (both research and motor octane number). Thus, there is a need for a process wherein desulfurization of cracked-gasoline is achieved while the octane number is maintained.

In addition to the need for removing sulfur from cracked-gasoline, there is also a need to reduce the sulfur content in diesel fuel. In removing sulfur from diesel fuel by hydrodesulfurization, the cetane is improved but there is a large cost in hydrogen consumption. Such hydrogen is consumed by both hydrodesulfurization and aromatic hydrogenation reactions. Thus, there is a need for a process wherein desulfurization of diesel fuel is achieved without significant consumption of hydrogen so as to provide a more economical desulfurization process.

Traditionally, sorbent compositions used in processes for removing sulfur from sulfur-containing fluids, such as cracked-gasoline and diesel fuel, have been agglomerates utilized in fixed bed applications. Because fluidized bed reactors have advantages over fixed bed reactors, such as better heat transfer and better pressure drop, sulfur-containing fluids are sometimes processed in fluidized bed reactors. Fluidized bed reactors generally use reactants that are in the form of relatively small particulates. The size of these particulates is generally in a range of from about 1 micron to about 10000 microns. Preferably, the particulate size is within a range of about 10 to about 200 microns, and most preferably within a size range of about 20 to about 150 microns, for best resistance to physical degradation. However, conventional reactant particulates generally do not have sufficient attrition resistance (i.e., resistance to physical deterioration) for all applications. Consequently, finding a sorbent with sufficient attrition resistance that removes sulfur from these sulfur-containing fluids and that can be used in fluidized, transport, moving, or fixed bed reactors is desirable and would be a significant contribution to the art and to the economy. Further, it is highly desirable for the reactant particulates to be as dense as possible in order to provide a higher capacity for sulfur removal per unit volume of the reactor.

SUMMARY OF THE INVENTION

Accordingly, it is an object of the present invention to provide a novel sorbent composition for removing sulfur from sulfur-containing fluids such as cracked-gasoline and diesel fuels.

Another object of the present invention is to provide a novel sorbent composition having enhanced attrition resistance.

A further object of this invention is to provide a novel sorbent composition having an increased bulk density.

Still another object of this invention is to provide a method of making a novel sorbent which is useful in the desulfurization of sulfur-containing fluid streams.

A still further object of this invention is to provide a process for the removal of sulfur from sulfur-containing fluid streams which minimizes saturation of olefins and aromatics therein.

A yet further object of this invention is to provide a process for the removal of sulfur from sulfur-containing fluid streams which minimizes hydrogen consumption.

It should be noted that the above-listed objects need not all be accomplished by the invention claimed herein and other objects and advantages of this invention will be apparent from the following description of the preferred embodiments and appended claims.

In one aspect of the present invention, there is provided a novel sorbent composition generally comprising a promoter metal, zinc oxide, and a refractory metal oxide. The sorbent composition has a bulk density of at least about 1.0 grams per cubic centimeter.

In accordance with another aspect of the present invention, there is provided a novel sorbent composition generally comprising a promoter metal, zinc oxide, and a silica source having a bulk density of at least about 10 pounds per cubic foot.

In accordance with a further aspect of the present invention, there is provided a novel method of preparing a sorbent composition. The method generally comprises the steps of: (a) combining a zinc oxide source, an aluminum source, and a silica source to provide a sorbent base, said silica source having a bulk density of at least about 10 pounds per cubic foot; (b) incorporating a promoter metal with the sorbent base to provide a promoted sorbent; and (c) reducing the valence of the promoter metal to provide a reduced sorbent.

In accordance with a still further aspect of the present invention, there is provided a novel desulfurization process generally comprising the steps of: (a) contacting a sulfur-containing fluid with a sorbent composition comprising zinc oxide, a silica source, and a promoter metal in a desulfurization zone under desulfurization conditions sufficient to form a desulfurized fluid and a sulfurized sorbent, wherein the sorbent composition has a bulk density of at least about 1 gram per cubic centimeter; (b) separating the desulfurized fluid from the sulfurized sorbent; (c) regenerating at least a portion of the separated sulfurized sorbent in a regeneration zone so as to remove at least a portion of the sulfur therefrom and provide a desulfurized sorbent; (d) reducing the desulfurized sorbent in an activation zone to provide a reduced sorbent composition which will effect the removal of sulfur from the sulfur-containing fluid when contacted with the same; and (e) returning at least a portion of the reduced sorbent composition to the desulfurization zone.

DETAILED DESCRIPTION OF THE PREFERRED EMBODIMENTS

In accordance with a first embodiment of the present invention, a novel sorbent composition suitable for removing sulfur from sulfur-containing fluids is provided. The sorbent composition generally comprises a promoter metal and a support which includes zinc oxide and a refractory metal oxide.

As used herein with reference to the promoter metal of the inventive sorbent composition, the term "metal" denotes metal in any form such as elemental metal, a metal oxide, or a metal oxide precursor. The promoter metal of the inventive sorbent composition is preferably selected from the group consisting of nickel, cobalt, iron, manganese, tungsten, silver, gold, copper, platinum, zinc, tin, ruthenium, molybdenum, antimony, vanadium, iridium, chromium, palladium, rhodium, oxides thereof, precursors to oxides thereof, and combinations thereof. Most preferably, the promoter metal is selected from the group consisting of nickel, nickel oxide, nickel oxide precursors, and combinations thereof. The promoter metal will generally be present in the sorbent composition in an amount in a range of from about 1 to about 60 weight percent promoter metal based on the total weight of the sorbent composition, preferably an amount in a range of from about 5 to about 50 weight percent promoter metal, most preferably in an amount in a range of from 10 to 40 weight percent promoter metal for best sulfur removal.

Usually, the promoter metal, in the common oxidation state of the promoter metal, is combined with the zinc oxide portion of the sorbent composition. Alternatively, the promoter metal, or even the entire sorbent composition, can be oxidized after sulfur removal to bring the promoter metal back to the common oxidized state. Prior to use as a sorbent, the number of oxygen atoms associated with the promoter metal must be reduced to form a reduced-valence promoter metal. Consequently, prior to sulfur removal, at least a portion of the promoter metal present in the sorbent composition must be present as a reduced-valence promoter metal. While not wishing to be bound by theory, it is believed that this reduced-valence promoter metal can chemisorb, cleave, or remove sulfur. Thus, either the number of oxygen atoms associated with the promoter metal is reduced or the oxidation state of the promoter metal is a zero-valent metal. For example, if nickel is the promoter metal, nickel oxide (NiO) can be used and the reduced-valence nickel (promoter metal) can be either nickel metal ($Ni^0$) or a non-stoichiometric nickel oxide having a formula of $NiO_{(1-x)}$ wherein $0<x<1$. In another example, while not wishing to be bound by theory, it is also believed that, if tungsten is the promoter metal, tungsten oxide ($WO_3$) can be used and the reduced-valence tungsten (promoter metal) can be either tungsten oxide ($WO_2$), tungsten metal ($W^0$), or a non-stoichiometric tungsten oxide having a formula of $WO_{(3-y)}$ wherein $0<y<3$.

Of the total quantity of the promoter metal present in the sorbent composition, it is preferred that at least about 10 weight percent of the promoter metal to be present in the form of a reduced-valence promoter metal, i.e., either a zero-valent metal or a non-stoichiometric metal oxide, as described above. More preferably at least about 40 weight percent of the promoter metal is a reduced-valence promoter metal, and most preferably at least 80 weight percent of the promoter metal is a reduced-valence promoter metal for best sorbent activity and sulfur removal. The reduced-valence promoter metal will generally be present in the sorbent composition of the present invention in an amount in a range of from about 0.5 to about 50 weight percent reduced-valence promoter metal based on the total weight of the sorbent composition, preferably in an amount in a range of from about 4 to about 40 weight percent reduced-valence promoter metal, and most preferably in an amount in a range of from 8 to 35 weight percent reduced-valence promoter metal for best sorbent activity and sulfur removal.

The zinc oxide component of the sorbent composition can be in the form of zinc oxide, such as powdered zinc oxide, or in the form of one or more zinc compounds that are convertible to zinc oxide. Examples of suitable zinc compounds that are convertible to zinc oxide include, but are not limited to, zinc sulfide, zinc sulfate, zinc hydroxide, zinc carbonate, zinc acetate, zinc nitrate, and combinations thereof. Preferably, the zinc oxide is present in the form of powdered zinc oxide for best sorbent activity and sulfur removal. Zinc oxide will generally be present in the sorbent composition in an amount in a range of from about 10 to about 90 weight percent zinc oxide based on the total weight of the sorbent composition, preferably in an amount in a range of from about 15 to about 60 weight percent zinc oxide, and most preferably in an amount in a range of from 20 to 55 weight percent zinc oxide for best sorbent activity and sulfur removal.

When the sorbent composition is exposed to high temperatures (e.g., during calcination), it is preferred for at least a portion of the zinc oxide and the promoter metal to form a substitutional solid solution having the general formula: $M_XZn_YO$, wherein M is the promoter metal, X is a numerical value in a range of from about 0.5 to about 0.99, and Y is a numerical value in a range of from about 0.01 to about 0.5. Such substitutional solid solution will generally be present in an amount in a range of from about 5 to about 60 percent by weight of the sorbent composition, most preferably from 20 to 40 weight percent. When the sorbent composition comprising the substitutional solid solution is reduced (i.e., activated), it is preferred that at least a portion of the substitutional solid solution to be converted to a reduced metal solid solution having the general formula: $M_AZn_B$, wherein M is the promoter metal, A is a numerical value in a range of from about 0.7 to about 0.99, and B is a numerical value in a range of from about 0.01 to about 0.3. Such reduced metal solid solution will generally be present in an amount in a range of from about 5 to about 70 percent by weight of the sorbent composition, most preferably from 25 to 45 weight percent.

The refractory metal oxide component of the inventive sorbent composition can be any metal oxide which enhances the porosity of the resulting sorbent composition such that the active sites of the sorbent can be contacted by the reacting mixture. Preferably, the refractory metal oxide employed in the sorbent composition of the present invention is a high density refractory metal oxide having a bulk density of at least about 10 pounds per cubic foot, more preferably at least about 20 pounds per cubic foot, still more preferably at least about 40 pounds for cubic foot, yet still more preferably at least about 60 pounds per cubic foot, and most preferably in a range of from 60 pounds per cubic foot to 100 pounds per cubic foot.

The refractory metal oxide component preferably comprises a silica source. Any suitable silica source may be employed in preparing the sorbent composition of the present invention. Examples of suitable silica sources include, but are not limited to, aluminum silicates, diatomite, crushed expanded perlite, non-expanded perlite, silicalite, silica colloid, flame-hydrolyzed silica, hydrolyzed silica, silica gel, precipitated silica, and combinations thereof. In addition, silicon compounds that are convertible to silica such as silicic acid, ammonium silicate, and the like, and combinations thereof can also be employed. The silica source preferably comprises at least about 50 weight percent $SiO_2$ and less than about 25 weight percent $Al_2O_3$. More preferably, the silica source comprises at least about 60 weight percent $SiO_2$ and less than about 15 weight percent $Al_2O_3$. Most preferably, the silica source is a non-expanded perlite having the above-described bulk density, $SiO_2$ content, and $Al_2O_3$ content. A preferred example of one suitable silica source is a high density, non-expanded perlite, such as Harborlite™ PA-4000, available from Harborlite Corporation, Antonito, Colo. The silica source will generally be present in the sorbent composition of the present invention in an amount in a range of from about 5 to about 85 weight percent silica source based on the total weight of the sorbent composition, preferably in an amount in a range of from about 10 to about 60 weight percent silica source, and most preferably in an amount in a range of from 15 to 55 weight percent silica source.

The refractory metal oxide component can further comprise an aluminum source. When the support comprises an aluminum source, the aluminum source used in preparing the support composition of the present invention can be any suitable commercially available alumina material including, but not limited to, colloidal alumina solutions, hydrated aluminas, peptized aluminas, and, generally, those alumina compounds produced by the dehydration of alumina hydrates. The preferred alumina source is a hydrated alumina such as, for example, boehmite or pseudoboehmite for best sorbent activity and sulfur removal. When the support 5comprises an aluminum source, the aluminum source will generally be present in the support composition of the present invention in an amount in a range of from about 1 to about 30 weight percent aluminum source based on the total weight of the sorbent composition, preferably in an amount in a range of from about 5 to about 20 weight percent aluminum source, and most preferably in an amount in a range of from 5 to 15 weight percent aluminum source for best sorbent activity and sulfur removal. When the sorbent composition is exposed to high temperatures (e.g., during calcination) at least a portion, preferably a substantial portion of the aluminum source is converted to an aluminate, most preferably a zinc aluminate and/or a nickel-zinc aluminate. Preferably, the sorbent composition comprises from about 2 to about 30 weight percent nickel-zinc aluminate, most preferably from 8 to 25 weight percent nickel-zinc aluminate.

The support of the inventive sorbent composition can additionally comprise a binder. The binder can be any suitable compound that has cement-like properties which can help to bind these components of the sorbent composition together. Suitable examples of binders include, but are not limited to, cements such as, for example, gypsum plaster, common lime, hydraulic lime, natural cements, portland cement, and high alumina cement, and the like, and combinations thereof. A particularly preferred binder is calcium aluminate. When a binder is present, the amount of binder in the sorbent composition is generally in a range from about 0.1 to about 50 weight percent binder based on the total weight of the sorbent composition. Preferably, the amount of the binder in a sorbent composition is in a range of from about 1 to about 40 weight percent, most preferably in a range of from 5 to 30 weight percent.

The sorbent composition employed in the inventive desulfurization process is preferably in the form of a particulate, most preferably a microsphere, having an actual particle size within a range of about 1 microns to about 500 microns, preferably within a range of about 10 micrometers to about 300 micrometers for best sulfur removal, and most preferably within a range of about 20 to about 120 micrometers. Smaller particle sizes can cake, or clump, and larger particle sizes can be difficult to fluidize. The mean particle size of the particulates, or microspheres, usually is within a range of from about 40 micrometer (micron) to about 120 micrometers, more preferably in a range of from about 50 micrometers to about 100 micrometers for best sulfur removal, and most preferably within a range of about 60 to about 80 micrometers. As used herein, the term "mean particle size" refers to the size of the particulate material comprising the sorbent as determined by using a RO-TAP Testing Sieve-Shaker, manufactured by W. S. Tyler, Inc. of Mentor, Ohio, or other comparable sieves. To determine mean particle size, the material to be measured is placed in the top of a nest of standard 8 inch diameter stainless steel framed sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size, by the method outlined in Chapter 3 of *Fluidization Engineering* by Kunii and Levenspiel (1987).

It has been discovered that by employing a high density refractory metal oxide in the inventive sorbent composition, the attrition resistance and bulk density of the final sorbent composition is enhanced. As used herein, the term "attrition resistance" shall mean the measure of a particle's resistance to size reduction under controlled conditions of turbulent motion. The attrition resistance of a particle can be quantified using the Davison Index. The Davison Index represents the weight percent of the over 20 micrometer particle size fraction which is reduced to particle sizes of less than 20 micrometers under test conditions. The Davison Index is measured using a jet cup attrition determination method. The jet cup determination method involves screening a 5 gram sample of sorbent to remove particles in a 0 to 20 micrometer size range. The particles above 20 micrometers are then subjected to a tangential jet of air at a rate of 21 liters per minute introduced through a 0.0265 inch orifice fixed at the bottom of a specially designed jet cup (1 inch I.D. by 2 inch height) for a period of one hour. The Davison Index (DI) is calculated as follows:

$$DI = \frac{\text{Wt. of } 0-20 \text{ Micrometer Formed During Test}}{\text{Wt. of Original}+20 \text{ Micrometer Fraction Tested}} \times$$

$$100 \times \text{Correction Factor}$$

The sorbent composition of the present invention preferably has a Davison Index of less than about 20 percent, more preferably less than about 15 percent and most preferably less than 12 percent for best sulfur removal and process efficiency. The sorbent composition of the present invention, employing a high density refractory metal oxide, has an enhanced attrition resistance when compared to sorbent compositions which do not include a high density refractory metal oxide.

The bulk density of the sorbent composition of the present invention, which includes a high density refractory metal oxide, is preferably at least about 1.0 grams per cubic centimeter, more preferably at least about 1.2 grams per cubic centimeter, and most preferably at least 1.5 grams per cubic centimeter for best sulfur removal and process efficiency. The sorbent composition of the present invention has a higher bulk density than sorbent compositions which do not utilize a high density refractory metal oxide.

In accordance with a second embodiment of the second invention, a process for making the inventive sorbent composition of the first embodiment of the present invention is provided.

In the manufacture of the inventive sorbent composition, the support is generally prepared by combining the support components, described above, together in appropriate proportions, described above, by any suitable method or manner known in the art which provides for the intimate mixing of such components to thereby provide a substantially homogeneous mixture comprising the support components, preferably a substantially homogeneous mixture comprising zinc oxide and the refractory metal oxide. Any suitable means for mixing the support components can be used to achieve the desired dispersion of the components. Examples of suitable means for mixing include, but are not limited to, mixing tumblers, stationery shelves or troughs, Muller mixers, which are of the batch or continuous type, impact mixers, and the like. It is presently preferred to use a Muller mixer as the means for mixing the support components.

The support ingredients are contacted together by any manner known in the art to provide a resulting mixture which can be in the form selected from the group consisting of a wet mix, a dough, a paste, a slurry, and the like. Such resulting support mixture can then be shaped to form a particulate(s) selected from the group consisting of a granulate, an extrudate, a tablet, a sphere, a pellet, a microsphere, and the like. For example, if the resulting support mixture is in the form of a wet mix, the wet mix can be densified, dried, calcined and thereafter shaped, or particulated, through the granulation of the densified, dried, calcined mix to form granulates. Also, for example, when the resulting support mixture is in the form of either a dough state or a paste state, such resulting mixture can then be shaped, preferably extruded, to form a particulate, preferably cylindrical extrudates having a diameter in the range of from about 1/32 of an inch to 1/2 inch at any suitable length, preferably a length in a range of from about 1/8 inch to about 1 inch. The resulting support particulates, preferably cylindrical extrudates, are then dried and calcined under conditions disclosed herein.

Most preferably, the resulting support mixture is in the form of a slurry, and a particulation of such slurry is achieved by spray drying the slurry to form microspheres having a mean particle size generally in a range of from about 1 micron to about 500 microns, preferably in a range of from about 10 microns to about 300 microns. Spray drying is known in the art and is discussed in *Perry's Chemical Engineers Handbook*, Sixth, Edition, published by McGraw-Hill Incorporated at pages 20 through 58. Additional information can be obtained from the *Handbook Of Industrial Drying*, published by Marcel Dekker, Inc., at pages 243 through 293.

After spray drying, the support particulate can then be dried under drying conditions as disclosed herein and calcined under calcining conditions as disclosed herein.

The resulting dried and calcined support particulate can then be contacted with a promoter metal source to thereby incorporate the promoter metal with the dried and calcined support particulate. The promoter metal may be incorporated on, in, or with the dried and calcined support particulate by any suitable means or method known in the art such as, for example, impregnating, soaking, spraying, and combinations thereof. The preferred method of incorporating the promoter metal into the dried and calcined support particulate is impregnating using standard incipient wetness impregnation techniques. A preferred method uses an impregnating solution comprising the desired concentration of the promoter metal so as to ultimately provide a promoted particulate which can be subjected to drying, calcining, and reduction to provide the sorbent composition of the present invention. The impregnating solution can be an aqueous solution in the amounts of such solution which suitably provides for the impregnation of the dried and calcined support particulates. A preferred impregnating solution is formed by dissolving a promoter metal source in water. It is acceptable to use a slightly acidic solution to aid in the dissolution of the promoter metal source. It is more preferred for the support particulates to be impregnated with the promoter metal by use of a solution containing nickel nitrate hexahydrate dissolved in water.

Generally, the amount of the promoter metal incorporated, preferably impregnated, onto, into, or with the support component, is an amount which provides, after the promoted particulate material has been dried, calcined, and reduced, a sorbent composition having an amount of the promoter metal as disclosed herein. It may be necessary to employ more than one incorporation step in order to obtain the desired quantity of the promoter metal. If so, such additional incorporation(s) are performed in substantially the same manner as described above.

Once the promoter metal has been incorporated in, on, or with the dried and calcined support particulates, the promoted particulate is subsequently dried and calcined under conditions disclosed herein to thereby provide a dried, calcined, promoted particulate comprising an unreduced promoter.

Generally, a drying condition, as referred to herein, can include a temperature in a range of from about 180° F. to about 290° F., preferably in a range of from about 190° F. to about 280° F. and more preferably in a range of 200° F. to 270° F. Such drying condition can also include a time period generally in a range of from about 0.5 hour to about 60 hours, preferably in a range of from about 1 hour to about 40 hours, and more preferably in a range of from 1.5 hours to 20 hours. Such drying condition can also include a pressure generally in a range of from about atmospheric (i.e., 14.7 pounds per square inch absolute) to about 150 pounds per square inch absolute (psia), preferably in a range of from about atmospheric to 100 psia, more preferably about atmospheric, so long as the desired temperature can be maintained. Any drying method(s) known to one skilled in the art such as, for example, air drying, heat drying, vacuum drying, and the like and combinations thereof can be used.

Generally, a calcining condition, as referred to herein, can include a temperature in a range of from about 400° F. to about 1800° F., preferably in a range of from about 600° F. to about 1600° F., and more preferably in a range of from 800° F. to about 1500° F. Such calcining condition can also include a time period generally in a range of from about 1 hour to about 60 hours, preferably in a range of from about 2 hours to about 20 hours, and more preferably in a range of from 3 hours to 15 hours. Such calcining condition can also include a pressure, generally in a range of from about 7 psia to about 750 psia, preferably in a range of from about 7 psia to about 450 psia, and more preferably in a range from 7 psia to 150 psia.

The dried, calcined, promoted particulates are thereafter subjected to reduction with a suitable reducing agent, preferably hydrogen, under reducing conditions, to thereby provide a reduced sorbent composition comprising a reduced-valence promoter as described above. Reduction can be carried out at a temperature in a range from about 100° F. to about 1500° F. and at a pressure in a range of from about 15 psia to about 1500 psia. Such reduction can be carried out for a time period sufficient to achieve the desired level of reduction of the promoter metal. Such reduction can generally be achieved in a time period in a range of from about 0.01 hour to about 20 hours.

In accordance with a third embodiment of the present invention, a desulfurization process is provided which employs the novel sorbent composition described herein. In the inventive desulfurization process, the novel sorbent composition is contacted with a sulfur-containing fluid to thereby form a desulfurized fluid and a sulfurized sorbent.

The sulfur-containing fluid employed in the desulfurization process of the present invention is preferably a hydrocarbon-containing fluid comprising a quantity of sulfur compounds therein. Preferably, such hydrocarbon-containing fluid can be used as a fuel or can be a precursor to fuel. Examples of suitable hydrocarbon-containing fluids include cracked-gasoline, diesel fuels, jet fuels, straight-run naphtha, straight-run distillates, coker gas oil, coker naphtha, alkylates, and straight-run gas oil. Most preferably, the sulfur-containing fluid comprises a hydrocarbon-containing fluid selected from the group consisting of gasoline, cracked-gasoline, diesel fuel, and mixtures thereof.

As used herein, the term "gasoline" denotes a mixture of hydrocarbons boiling in a range of from about 100° F. to about 400° F., or any fraction thereof. Examples of suitable gasolines include, but are not limited to, hydrocarbon streams in refineries such as naphtha, straight-run naphtha, coker naphtha, catalytic gasoline, visbreaker naphtha, alkylates, isomerate, reformate, and the like, and mixtures thereof.

As used herein, the term "cracked-gasoline" denotes a mixture of hydrocarbons boiling in a range of from about 100° F. to about 400° F., or any fraction thereof, that are products of either thermal or catalytic processes that crack larger hydrocarbon molecules into smaller molecules. Examples of suitable thermal processes include, but are not limited to, coking, thermal cracking, visbreaking, and the like, and combinations thereof. Examples of suitable catalytic cracking processes include, but are not limited to, fluid catalytic cracking, heavy oil cracking, and the like, and combinations thereof. Thus, examples of suitable cracked-gasolines include, but are not limited to, coker gasoline, thermally cracked gasoline, visbreaker gasoline, fluid catalytically cracked gasoline, heavy oil cracked-gasoline and the like, and combinations thereof. In some instances, the cracked-gasoline may be fractionated and/or hydrotreated prior to desulfurization when used as the sulfur-containing fluid in the process in the present invention.

As used herein, the term "diesel fuel" denotes a mixture of hydrocarbons boiling in a range of from about 300° F. to about 750° F., or any fraction thereof. Examples of suitable diesel fuels include, but are not limited to, light cycle oil, kerosene, jet fuel, straight-run diesel, hydrotreated diesel, and the like, and combinations thereof.

The sulfur-containing fluid described herein as suitable feed in the inventive desulfurization process comprises a quantity of olefins, aromatics, and sulfur, as well as paraffins and naphthenes. The amount of olefins in gaseous cracked-gasoline is generally in a range of from about 10 to about 35 weight percent olefins based on the total weight of the gaseous cracked-gasoline. For diesel fuel there is essentially no olefin content. The amount of aromatics in gaseous cracked-gasoline is generally in a range of from about 20 to about 40 weight percent aromatics based on the total weight of the gaseous cracked-gasoline. The amount of aromatics in gaseous diesel fuel is generally in a range of from about 10 to about 90 weight percent aromatics based on the total weight of the gaseous diesel fuel. The amount of atomic sulfur, as sulfur, in the sulfur-containing fluid, preferably cracked-gasoline or diesel fuel, suitable for use in the inventive desulfurization process is generally greater than about 50 parts per million by weight (ppmw) of the sulfur-containing fluid, more preferably in a range of from about 100 ppmw atomic sulfur to about 10,000 ppmw atomic sulfur, and most preferably from 150 ppmw atomic sulfur to 500 ppmw atomic sulfur. It is preferred for at least about 50 weight percent of the atomic sulfur present in the sulfur-containing fluid employed in the present invention to be in the form of organosulfur compounds. More preferably, at least about 75 weight percent of the atomic sulfur present in the sulfur-containing fluid is in the form of organosulfur compounds, and most preferably at least 90 weight percent of the atomic sulfur is in the form of organosulfur compounds. As used herein, "sulfur" used in conjunction with "ppmw sulfur" or the term "atomic sulfur", denotes the amount of atomic sulfur (about 32 atomic mass units) in the sulfur-containing fluid, not the atomic mass, or weight, of a sulfur compound, such as an organo-sulfur compound.

As used herein, the term "sulfur" denotes sulfur in any form normally present in a sulfur-containing fluid such as cracked-gasoline or diesel fuel. Examples of such sulfur which can be removed from a sulfur-containing fluid through the practice of the present invention include, but are not limited to, hydrogen sulfide, carbonal sulfide (COS), carbon disulfide ($CS_2$), mercaptans (RSH), organic sulfides (R—S—R), organic disulfides (R—S—S—R), thiophene, substitute thiophenes, organic trisulfides, organic tetrasulfides, benzothiophene, alkyl thiophenes, alkyl benzothiophenes, alkyl dibenzothiophenes, and the like, and combinations thereof, as well as heavier molecular weights of the same which are normally present in sulfur-containing fluids of the types contemplated for use in the desulfurization process of the present invention, wherein each R can by an alkyl, cycloalkyl, or aryl group containing 1 to 10 carbon atoms.

As used herein, the term "fluid" denotes gas, liquid, vapor, and combinations thereof.

As used herein, the term "gaseous" denotes the state in which the sulfur-containing fluid, such as cracked-gasoline or diesel fuel, is primarily in a gas or vapor phase. The contacting of the sulfur-containing fluid and sorbent composition is carried out in a desulfurization zone of a reactor under a set of desulfurization conditions that include total pressure, temperature, and weighted hourly space velocity.

The desulfurization conditions at which the desulfurization zone is maintained preferably include a temperature in a range of from about 200° F. to about 1200° F., more preferably from about 500° F. to about 900° F., and most preferably from 600° F. to 800° F. for best sulfur removal.

The total pressure at which the desulfurization zone is maintained is preferably in a range of from about 15 pounds per square inch gauge (psig) to about 1500 psig, more preferably from about 50 psig to about 600 psig, and most preferably from 100 psig to 200 psig for best sulfur removal.

As used herein, the term "weighted hourly spaced velocity" or "WHSV" is defined as the numerical ratio of the rate at which the sulfur-containing fluid is charged to the desulfurization zone in pounds per hour at standard conditions of temperature and pressure (STP) divided by the pounds of the sorbent composition contained in the desulfurization zone to which the sulfur-containing fluid is charged. In the practice of the present invention, such WHSV should be in a range of about 0.5 $hr^{-1}$ to about 50 $hr^{-1}$, preferably in a range of from about 1 $hr^{-1}$ to about 20 $hr^{-1}$ for best sulfur removal. Desulfurization of the sulfur-containing fluid in the desulfurization zone should be conducted for a time sufficient to affect the removal of at least a substantial portion of the sulfur from such sulfur-containing fluid.

In desulfurizing the sulfur-containing fluid, it is presently preferred that a diluent be employed which interferes with chemical or physical reacting of the olefinic and aromatic compounds in the sulfur-containing fluid. Preferably, such diluent comprises hydrogen. The diluent charged to the reaction zone preferably contains at least about 25 volume percent hydrogen based on the total volume of the diluent, more preferably at least about 50 volume percent hydrogen, still more preferably at least about 75 volume percent hydrogen, and most preferably at least 95 volume percent hydrogen. If desired, the diluent can further comprise compounds such as methane, carbon dioxide, flu gas, nitrogen, and the like, and combinations thereof. Thus, it is not essential to the practice of the present invention that a high purity hydrogen be employed in achieving the desired desulfurization of the sulfur-containing fluid. The amount of hydrogen charged to the desulfurization zone is generally such that the mole ratio of hydrogen to sulfur-containing fluid is in a range of from about 0.01:1 to about 100:1, more preferably from about 0.1:1 to about 10:1, and most preferably from 0.5:1 to 2:1 for best sulfur removal.

Preferably, the desulfurization conditions employed in the desulfurization process of the present invention are sufficient to provide vaporization of substantially all of the sulfur-containing fluid present in the desulfurization zone. Preferably, at least about 75 weight percent of the sulfur-containing fluid present in the desulfurization zone is in the vapor phase, more preferably at least about 95 weight percent of the sulfur-containing fluid is in the vapor phase, and most preferably at least 98 weight percent of the sulfur-containing fluid is in the vapor phase for best sulfur removal.

It is presently preferred that the desulfurization reaction of the present invention is carried out in the reaction zone of a fluidized bed reactor. As used herein, the term "fluidized bed reactor" denotes a reactor wherein a fluid feed, as defined earlier, can be contacted with solid particles (such as sorbent particles) in a manner such that the solid particles are at least partly suspended within the reaction zone by the flow of the fluid feed through the reaction zone and the solid particles are substantially free to move about within the reaction zone as driven by the flow of the fluid feed through the reaction zone. It is presently preferred, when the desulfurization zone is in a fluidized bed reactor system, that a sorbent composition be used having a mean particle size in a range of from about 1 micron to about 500 microns, preferably from about 10 microns to about 300 microns.

When the sorbent composition is contacted with the sulfur-containing fluid in the desulfurization zone, sulfur compounds, particularly organosulfur compounds, present in the sulfur-containing fluid are removed from such fluid. At least a portion of the sulfur removed from the sulfur-containing fluid is employed to convert at least a portion of the zinc oxide of the sorbent composition into zinc sulfide. While not wishing to be bound by theory, it is believed that the promoter metal of the sorbent composition functions to facilitate removal of the sulfur from the sulfur-containing fluid while the zinc oxide functions to facilitate the storage of the sulfur on/in the sorbent composition through the conversion of at least a portion of the zinc oxide to zinc sulfide.

In contrast to many conventional sulfur removal processes (e.g., hydrodesulfurization), it is preferred that substantially none of the sulfur removed from the sulfur-containing fluid is converted to hydrogen sulfide. Rather, it is preferred that the fluid effluent (comprising the desulfurized fluid and the diluent) from the desulfurization zone comprises not more than about 200 percent (by weight) of the amount of hydrogen sulfide in the fluid feed (comprising the sulfur-containing fluid and the diluent) charged to the desulfurization zone, more preferably not more than about 150 percent of the amount of hydrogen sulfide in the fluid feed, and most preferably less hydrogen sulfide than the fluid feed.

The fluid effluent from the desulfurization zone preferably contains less than about 50 weight percent of the amount of sulfur in the fluid feed charged to the desulfurization zone, more preferably less than about 20 weight percent of the amount of sulfur in the fluid feed, and most preferably less than 5 weight percent of the amount of sulfur in the fluid feed. It is preferred for the total sulfur content of the fluid effluent from the desulfurization zone to be less than about 50 parts per million by weight (ppmw) of the total fluid effluent, more preferably less than about 30 ppmw, still more preferably less than about 15 ppmw, and most preferably less than 10 ppmw. The desulfurized fluid, preferably desulfurized cracked-gasoline or diesel fuel, can thereafter be recovered from the fluid effluent and preferably liquified. The liquification of such desulfurized fluid can be accomplished by any method or manner known in the art. The liquefied, desulfurized fluid preferably comprises less than about 50 weight percent of the amount of sulfur in the sulfur-containing fluid charged to the desulfurization zone, more preferably less than about 20 weight percent of the amount of sulfur in the sulfur-containing fluid, and most preferably less than 5 weight percent of the amount of sulfur in the sulfur-containing fluid. The desulfurized fluid preferably comprises less than about 50 ppmw sulfur, more preferably less than about 30 ppmw sulfur, still more preferably less than about 15 ppmw sulfur, and most preferably less than 10 ppmw sulfur.

After sulfur removal in the desulfurization zone, the fluids in the reaction zone and the solids in the reaction zone can then be separated by any manner or method known in the art for separating a solid from a fluid, preferably a solid from a gas. Examples of suitable separating means for separating solids and gasses include, but are not limited to, cyclonic devices, settling chambers, impingement devices, filters, and combinations thereof.

After separation of the sulfurized sorbent from the fluid effluent of the reactor, the sulfurized sorbent is preferably regenerated in a regeneration zone by contacting the sulfurized sorbent composition with an oxygen-containing regeneration stream under suitable regeneration conditions. The regeneration is preferably carried out at a temperature in a range of from about 200° F. to about 1500° F., more preferably from about 500° F. to about 1200° F., and most preferably from 800° F. to 1100° F. The total pressure in the regeneration zone is preferably maintained in a range of from about 10 psig to about 1500 psig, more preferably in a range of from 15 psig to 100 psig. The residence time of the sorbent in the regeneration zone can be anytime sufficient to achieve the desired level of sorbent regeneration. Such regeneration residence time is preferably in a range of from about 0.1 hours to about 24 hours, more preferably from 0.5 hours to 3 hours. These parameters provide for best sorbent regeneration.

The oxygen-containing regeneration stream employed in the regeneration step can be any oxygen-containing stream that, when contacted with the sulfurized sorbent composition under the above-described regeneration conditions, promotes the conversion of at least a portion of the zinc sulfide associated with desulfurized sorbent to zinc oxide, promotes the return of at least a substantial portion of the promoter metal to its common oxidized (i.e., unreduced) state, and burns off any remaining hydrocarbon deposits that might be present on the sulfurized sorbent composition.

In carrying out the process of the present invention, a stripper zone can be inserted before and/or after, preferably before, regenerating the sulfurized sorbent composition in the regeneration zone. Such stripper zone, preferably utilizing a stripping agent, will serve to remove a portion, preferably all, of any hydrocarbon(s) from the sulfurized sorbent composition. Such stripper zone can also serve to remove oxygen and sulfur dioxide from the system prior to introduction of the regenerated sorbent composition into the activation zone. Such stripping employs a set of conditions that includes a total pressure, temperature, and stripping agent partial pressure.

Preferably, the stripping, when employed, is carried out at a total pressure in a range of from about 25 pounds per square inch absolute (psia) to about 500 psia. The temperature for such stripping can be in a range of from about 100° F. to about 1000° F. Such stripping is carried out for a time sufficient to achieve the desired level of stripping. Such stripping can generally be achieved in a time period in a range of from about 0.1 hour to about 4 hours, preferably in a range of from about 0.3 hour to about 1 hour. The stripping agent is a composition(s) that helps remove a hydrocarbon (s) from a sulfurized sorbent composition. Preferably, the stripping agent is nitrogen.

After regeneration, and optionally stripping, the desulfurized sorbent composition is subjected to reduction (i.e., activation) in an activation zone under activation conditions with a reducing stream, preferably a hydrogen-containing reducing stream, so that at least a portion of the unreduced promoter metal of the desulfurized sorbent composition is reduced, thereby providing a reduced sorbent composition comprising a reduced-valence promoter metal. Such reduced-valence promoter metal is present in the sorbent composition in an amount which provides for the removal of sulfur from a sulfur-containing fluid according to the process of the present invention.

Typical activation conditions at which the activation zone is maintained includes a temperature in a range of from about 100° F. to about 1500° F., more preferably from about 500° F. to about 900° F., and most preferably from 600° F. to 800° F. The activation zone is preferably maintained at a pressure in a range of from about 10 psig to about 1500 psig, more preferably from 15 psig to 100 psig. The residence time of the sorbent in the activation zone is preferably in a range of from about 0.1 hours to about 40 hours, more preferably from about 0.2 hours to about 10 hours, and most preferably from about 0.5 hours to 1 hour. The reducing stream with which the regenerated sorbent is contacted in the activation zone preferably contains at least about 25 volume percent hydrogen, more preferably at least about 50 volume percent hydrogen, still more preferably at least about 90 volume percent hydrogen, and most preferably at least 95 volume percent hydrogen. It is not essential to the practice of the present invention that a high purity hydrogen be employed in achieving the desired reduction (i.e., activation) of the sorbent composition. Conditions recited in this paragraph provide for best activation of the desulfurized sorbent.

Once the sorbent has been activated in the activation zone, at least a portion of the activated sorbent can be returned to the desulfurization zone for further desulfurization of the sulfur-containing fluid.

When carrying out the process of the present invention, the steps of desulfurizing, regenerating, activating, and optionally stripping before and/or after regenerating, can be accomplished in a single zone or vessel or in multiple zones or vessels. The desulfurization zone can be any zone wherein desulfurizing of a sulfur-containing fluid, such as cracked-gasoline or diesel fuel, can take place. The regeneration zone can be any zone where regenerating of a sulfurized sorbent can take place. The activation zone can be any zone wherein reducing (i.e., activating) a regenerated, desulfurized sorbent can take place. Examples of suitable zones are fixed bed reactors, moving bed reactors, fluidized bed reactors, transport reactors, reactor vessels, and the like. When carrying out the process of the present invention in a fixed bed reactor, the steps of desulfurizing, regenerating, and activating, are accomplished in a single zone or vessel. When carrying out the process of the present invention in a fluidized bed reactor system, the steps of desulfurizing, regenerating, and reducing are accomplished in multiple zones or vessels.

The following examples are presented to further illustrate this invention and are not to be construed as unduly limiting the scope of this invention.

EXAMPLE I

Sorbent A was prepared by mixing 800 grams of distilled water and 100 grams of aluminum hydroxide powder (Dispal® Alumina Powder, available from CONDEA Vista Company, Houston, Tex.) to create an aluminum solution. In a separate container, a 560 gram quantity of zinc oxide powder (available from Zinc Corporation, Monaca, Pa.) and a 160 gram quantity of high density (65–70 lb/ft$^3$) non-expanded perlite (Harborlite™ P-4000, available from Harborlite Corporation, Antonito, Colo.) were combined to create a powdered mixture. The powdered mixture and aluminum solution were then combined and mixed to create a sorbent base slurry.

The sorbent base slurry was then formed into sorbent particulates using a counter-current spray drier (Niro Atomizer Model 68, available from Niro Atomizer, Inc., Columbia, Md.). The sorbent base slurry was charged to the spray drier wherein it was contacted in a particulating chamber with air flowing through the chamber. The sorbent base particulates were then placed in an oven and dried by ramping the oven temperature at 3° C./min to 150° C. and holding at 150° C. for 1 hour. The dried sorbent base particulates were then calcined by ramping the oven temperature at 5° C./min to 635° C. and holding at 635° C. for 1 hour. The dried sorbent base particulates had a pore volume of 0.37 cc/g, a loose bulk density of 1.33 g/cc and a packed bulk density of 1.46 g/cc.

The calcined sorbent base particulates were then sieved to provide a 227.25 gram quantity which passed through the 50 mesh sieve but was retained above the 325 mesh sieve (i.e., −50/+325 mesh). The resulting 227.25 gram quantity of sieved sorbent base particulates were then impregnated with a solution containing 112.52 grams of nickel nitrate hexahydrate and 29 grams of distilled water using incipient wetness techniques. The impregnated sorbent was then put in an oven and dried by ramping the oven temperature at 3° C./min to 150° C. and holding at 150° C. for 1 hour. The dried sorbent was then calcined by ramping the oven temperature at 5° C./min to 635° C. and holding at 635° for 1 hour. The resulting once-promoted sorbent was then sieved to provide a 150 gram quantity which passed through the 100 mesh sieve but was retained above the 325 mesh sieve (i.e., −100/+325 mesh). The resulting 150 gram quantity of sieve sorbent was then impregnated with a solution containing 74.27 grams of nickel nitrate hexahydrate and 2 grams of distilled water using incipient wetness techniques. The twice-impregnated sorbent was then dried in an oven by ramping the oven temperature at 3° C./min to 150° C. and holding at 150° C. for 1 hour. The dried, twice impregnated sorbent was then calcined by ramping the oven temperature at 5° C./min to 635° C. and holding at 635° C. for 1 hour. The resulting nickel promoted sorbent was designated Sorbent A, having a lose bulk density of 1.42 g/cc and a packed bulk density of 14.64 g/cc.

Sorbent B was prepared by mixing 900 grams of distilled water and 100 grams of aluminum hydroxide powder (Dispal® Alumina Powder, available from CONDEA Vista Company, Houston, Tex.) to create an aluminum solution. In a separate container, a 560 gram quantity of zinc oxide powder (available from Zinc Corporation, Monaca, Pa.), a 120 gram quantity of diatomaceous earth (Celite® Filter Cell, available from Manville Sales Corporation, Lampoc, Calif.), and a 40 gram quantity of high density (65–70 lbs/ft$^3$) perlite (Harborlite PA4000™, available from Harborlite Corporation, Antonito, Colo.) were combined to create a powdered mixture. The powdered mixture and alumina solution were then combined and mixed to create a sorbent base slurry.

The sorbent base slurry was then formed into sorbent particulate using a counter-current spray drier (Niro Atomizer Model 68, available from Niro Atomizer, Inc., Columbia, Md.). The sorbent base slurry was charged to the spray drier wherein it was contacted in a particulating chamber with air flowing through the chamber. The sorbent base particulates were then sieved to provide a sieved quantity which passed through the 50 mesh sieve but was retained above the 325 mesh sieve (i.e., −50/+325 mesh). The sieved sorbent base particulates were then placed in an oven and dried by ramping the oven temperature at 3° C./min to 150° C. and holding at 150° C. for 1 hour. The dried sorbent base particulates were then calcined by ramping the oven temperature at 5° C./min to 635° C. and holding at 635° C. for 1 hour.

A 218.6 gram quantity of the calcined sorbent base particulates were then impregnated with a solution containing 108.22 grams of nickel nitrate hexahydrate and 58.27 grams of distilled water using incipient wetness techniques. The impregnated sorbent was then dried and calcined as described above. A 243 gram quantity of the resulting once-promoted sorbent was then impregnated with a solution containing 120.3 grams of nickel nitrate hexahydrate and 31.9 grams of distilled water using incipient wetness techniques. The twice-promoted sorbent was then dried and calcined as described above. The resulting nickel promoted sorbent was designated Sorbent B.

EXAMPLE II

The attrition resistance of Sorbents A and B was determined using the Davison Test. The Davison Index, which represents the weight percent of the over 20 micrometer particle size fraction which is reduced to particle sizes of less than 20 micrometers under test conditions, was measured using a jet cup attrition determination method. The jet cup attrition determination involved screening a 5 gram sample of sorbent to remove particles in the 0 to 20 micrometer size range. The sorbent particles above 20 micrometers were then subjected to a tangential jet of air at a rate of 21 liters per minute introduced through a 0.0625 inch diameter orifice at the bottom of a specially designed jet cup (1" I.D.×2" height) for a period of 1 hour. The Davison Index (DI) was calculated as follows:

$$DI = \frac{\text{Wt. of } 0-20 \text{ Micrometer Formed During Test}}{\text{Wt. of Original}+20 \text{ Micrometer Fraction Tested}} \times 100 \times \text{Correction Factor}$$

The correction factor of 0.3 was determined using a known calibration standard to adjust for differences in jet cup dimensions and wear.

The bulk density of Sorbents A and B was determined by filling a 10 cubic centimeter (cc) graduated cylinder to the top with the sorbent. The gross weight of the cylinder and sorbent was then measured. The tare weight of the cylinder was subtracted from the gross weight to determine the net weight of the sorbent in the 10 cc volume. The bulk density was calculated by dividing the net weight of the sorbent by 10 cc.

Table 1 summarizes the attrition resistance and bulk density of Sorbents A and B.

TABLE 1

| Sorbent | High Density Silica (wt % in support) | Davison Index (%) | Bulk Density (g/cc) |
|---|---|---|---|
| A | 19.5 | 8.7 | 1.64 |
| B | 4.9 | 10.6 | 1.20 |

Table 1 demonstrates that sorbents made with a high density silica source, such as non-expanded perlite, exhibit high bulk densities as well as enhanced attrition resistance was designated Sorbent B.

EXAMPLE III

The particulate solid reduced metal sorbents as prepared in Example I–II were tested for their desulfurization ability as follows.

A 1-inch quartz reactor tube was loaded with the indicated amounts, as noted below, of Sorbent A. Sorbent A was placed on a frit in the middle of the reactor and subjected to reduction with hydrogen as noted in Examples I–II. Gaseous cracked-gasoline having about 345 parts per million sulfur by weight (ppmw) sulfur-containing compounds based on the weight of the gaseous cracked-gasoline and having about 95 weight percent thiophenic compounds (such as, for example, alkyl benzothiophenes, alkyl thiophenes, benzothiophene and thiophene) based on the weight of sulfur-containing compound in the gaseous cracked-gasoline was pumped upwardly through the reactor. The rate was 13.4 milliliters per hour. This produced sulfurized solid sorbent and desulfurized gaseous-cracked gasoline.

Sorbent A was effective in reducing the gasoline sulfur content from 345 ppmw to about less than about 5 ppmw under the above-described conditions.

Sorbent A was were tested for four cycles. Each cycle was four hours long and the gasoline was tested for total organic sulfur (TOS) content after hours 2, 3 and 4 of each cycle. After each cycle, the sulfurized sorbent was subjected to desulfurizing conditions that included a temperature of 900° F., a total pressure of 15 psia and an oxygen partial pressure of 0.6 to 3.1 psi for a time period of 1-2 hours, to produce a desulfurized sorbent. Such conditions are hereinafter referred to as "regeneration conditions." Desulfurized Sorbent A was then subjected to reduction under conditions of a temperature of 700° F., a total pressure of 15 psia and a hydrogen partial pressure of 15 psi for a time period of 1.25 hours. Such conditions are hereinafter referred to as "reducing conditions".

The resulting solid reduced sorbent composition was then used in each succeeding cycle. Once again, a reduction in sulfur content to less than or equal to 5 ppmw resulted when Sorbent A was tested.

The test results are set forth in Table 2.

TABLE 2

| CYCLE | Run Time, hours | Total Organic Sulfur (TOS), ppmw |
|---|---|---|
|   | 0 |   |
| 1 | 1 | ND[(1)] |
|   | 2 | 5 |
|   | 3 | 5 |
|   | 4 | 5 |
| 2 | 5 | ND[(1)] |
|   | 6 | 2 |
|   | 7 | 2 |
|   | 8 | 2 |
| 3 | 9 | ND[(1)] |
|   | 10 | 5 |
|   | 11 | 2 |
|   | 12 | 2 |
| 4 | 13 | ND[(1)] |
|   | 14 | 2 |
|   | 15 | 5 |
|   | 16 | 5 |

ND[(1)] is "not determined" because the sorbent was being regenerated.

The data in Table 2 shows that inventive sorbents can be used repeatedly to consistently remove sulfur from gasoline and produce low level sulfur concentrations in the product.

Reasonable variations, modifications, and adaptations maybe made within a scope of this disclosure and the appended claims without departing from the scope of this invention.

What is claimed is:

1. A sorbent composition comprising:
    a promoter metal selected from the group consisting of nickel, cobalt, iron, manganese, tungsten, silver, gold, copper, platinum, zinc, tin, ruthenium, molybdenum, antimony, vanadium, iridium, chromium, palladium, oxides thereof, precursors to oxides thereof, and combinations thereof, said promoter metal being present in an amount in a range of from about 1 to about 60 weight percent and wherein at least a portion of said promoter metal is a reduced-valence promoter metal having a valence which is at least one valence number less than the valence of said promoter metal in its common oxidized state;
    zinc oxide in an amount in a range of from about 10 to about 90 weight percent;
    a refractory metal oxide in an amount in a range of from about 5 to about 85 weight percent; and
    an aluminate,
    said sorbent composition having a bulk density of at least about 1.0 grams per cubic centimeter.

2. A sorbent composition according to claim 1, wherein said promoter metal is selected from the group consisting of nickel, nickel oxide, nickel oxide precursors, and combinations thereof.

3. A sorbent composition according to claim 2, wherein at least 10 weight percent of said promoter metal has a valence 0.

4. A sorbent composition according to claim 3, wherein said sorbent composition has a bulk density of at least about 1.2 grams per cubic centimeter.

5. A sorbent composition comprising:
    a promoter metal;
    zinc oxide; and
    a silica source having a bulk density of at least about 10 pounds per cubic foot, said silica source further comprising at least about 50 weight percent $SiO_2$ and less than about 25 weight percent $Al_2O_3$,
    wherein said silica source comprises a non-expanded perlite.

6. A sorbent composition according to claim 5, wherein said sorbent composition has a bulk density of at least about 1.0 grams per cubic centimeter.

7. A sorbent composition according to claim 5, wherein said sorbent composition further includes an aluminate.

8. A sorbent composition according to claim 7, wherein said promoter metal is selected from the group consisting of nickel, cobalt, iron, manganese, tungsten, silver, gold, copper, platinum, zinc, tin, ruthenium, molybdenum, antimony, vanadium, iridium, chromium, palladium, oxides thereof, precursors to oxides thereof, and combinations thereof.

9. A sorbent composition, comprising:
    a promoter metal selected from the group consisting of nickel, cobalt, iron, manganese, tungsten, silver, gold, copper, platinum, zinc, tin, ruthenium, molybdenum, antimony, vanadium, iridium, chromium, palladium, oxides thereof, precursors to oxides thereof, and combinations thereof, wherein at least 10 weight percent of said promoter metal has a valence of 0;
    zinc oxide;
    a silica source having a bulk density of at least about 10 pounds per cubic foot,
    said silica source comprising a non-expanded perlite having a bulk density of at least about 20 pounds per cubic foot; and
    an aluminate.

10. A method of preparing a sorbent composition, said method comprising the steps of:
    (a) combining a zinc source, an aluminum source, and a silica source to provide a sorbent base, said silica source having a bulk density of at least about 10 pounds per cubic foot,
    (b) incorporating a promoter metal with said sorbent base to provide a promoted sorbent; and
    reducing the valence of said promoter metal to provide a reduced sorbent.

11. A method according to claim 10, wherein said silica source is selected from the group consisting of diatomite, crushed expanded perlite, non-expanded perlite, silicalite, silica colloid, flame-hydrolyzed silica, silica gel, precipitated silica, and combinations thereof.

12. A method according to claim 11, wherein said silica source is a non-expanded perlite.

13. A method according to claim 12, wherein said silica source comprises at least about 50 percent $SiO_2$ and less than about 25 weight percent $Al_2O_3$.

14. A method according to claim 13, wherein said silica source has a bulk density of at least about 40 pounds per cubic foot.

15. A method according to claim 14, wherein said zinc source is zinc oxide, said aluminum source is a hydrated alumina, and said promoter metal is selected from the group consisting of nickel, cobalt, iron, manganese, tungsten, silver, gold, copper, platinum, zinc, tin, ruthenium, molybdenum, antimony, vanadium, iridium, chromium, palladium, oxides thereof, precursors to oxides thereof, and combinations thereof.

16. A method according to claim 15, wherein said promoter metal is selected from the group consisting of nickel, nickel oxide, nickel oxide precursors, and combinations thereof.

17. A sorbent composition comprising:

a promoter metal having a valence which is at least one valence number less than the valence of said promoter metal in its common oxidized state;

zinc oxide; and a refractory metal oxide, said sorbent composition having a bulk density of at least about 1.0 grams per cubic centimeter.

18. A sorbent composition according to claim 17, wherein said promoter metal is selected from the group consisting of nickel, nickel oxide, nickel oxide precursors, and combinations thereof.

19. A sorbent composition according to claim 17, wherein at least 10 weight percent of said promoter metal has a valence of 0.

20. A sorbent composition according to claim 17, wherein said silica source has a bulk density of at least about 10 pounds per cubic foot.

* * * * *